US012782202B2

(12) United States Patent
Ye et al.

(10) Patent No.: US 12,782,202 B2
(45) Date of Patent: Nov. 3, 2026

(54) REPLACEMENT SYSTEM AND REPLACEMENT METHOD FOR METALLURGICAL TEMPERATURE MEASURING AND SAMPLING PROBE

(71) Applicant: BAOSHAN IRON & STEEL CO., LTD., Shanghai (CN)

(72) Inventors: Changhong Ye, Shanghai (CN); Ruimin Wu, Shanghai (CN); Xitao Song, Shanghai (CN); Zhenhong Wei, Shanghai (CN); Chen Shen, Shanghai (CN); Xinghong Sun, Shanghai (CN); Tianmao Huang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 353 days.

(21) Appl. No.: 18/683,147

(22) PCT Filed: Aug. 30, 2022

(86) PCT No.: PCT/CN2022/115842
§ 371 (c)(1),
(2) Date: Feb. 12, 2024

(87) PCT Pub. No.: WO2023/030318
PCT Pub. Date: Sep. 3, 2023

(65) Prior Publication Data

US 2024/0344893 A1 Oct. 17, 2024

(30) Foreign Application Priority Data

Aug. 30, 2021 (CN) ........................ 202111006165.6

(51) Int. Cl.

| | |
|---|---|
| ***G01K 1/14*** | (2021.01) |
| ***G01K 1/08*** | (2021.01) |
| *G01N 1/12* | (2006.01) |

(52) U.S. Cl.
CPC ................ *G01K 1/14* (2013.01); *G01K 1/08* (2013.01); *G01N 1/125* (2013.01)

(58) Field of Classification Search
CPC .. G01K 1/08; G01K 1/14; G01K 7/02; G01K 13/125; G01N 1/125; Y02P 10/20
See application file for complete search history.

(56) References Cited

U.S. PATENT DOCUMENTS

| | | | | |
|---|---|---|---|---|
| 4,543,838 A | 10/1985 | Fohler | | |
| 6,433,862 B1 * | 8/2002 | Schock | G01N 33/205 | 73/864.81 |
| 2009/0110026 A1 * | 4/2009 | Midash | G01K 1/146 | 374/E1.016 |

FOREIGN PATENT DOCUMENTS

| | | | |
|---|---|---|---|
| CN | 108444616 A | 8/2018 | |
| CN | 109061209 A * | 12/2018 | G01N 35/0099 |

(Continued)

OTHER PUBLICATIONS

Computer translation of CN_109570948_A (Year: 2026).*

(Continued)

*Primary Examiner* — Randy W Gibson
(74) *Attorney, Agent, or Firm* — Barclay Damon LLP

(57) ABSTRACT

Provided is a replacement system for a metallurgical temperature measuring and sampling probe (200). The replacement system is arranged at a temperature measuring gun (100) for measuring the temperature of a molten metal ladle, and comprises: a six-axis manipulator (1), a clamping tool (2) mounted at a tail end of the six-axis manipulator (1), a shelf (3) for storing the temperature measuring and sampling probe (200), a shearing machine (4), and a waste material box (5), wherein the temperature measuring gun (100), the shelf (3), the shearing machine (4), and the waste material box (5) are sequentially arranged in different directions within a rotation range of the six-axis manipulator (1), (Continued)

respectively; the waste material box (5) is arranged close to the shearing machine (4); the clamping tool (2) comprises a base (21), a clamping jaw (22) configured to clamp the temperature measuring and sampling probe (200) and a positioning jaw (23) which are arranged in parallel at a front end of the base (21), and a detection device (24) located between the clamping jaw (22) and the positioning jaw (23); a center line of a clamping space of the clamping jaw (22) and a center line of a positioning space of the positioning jaw (23) are located on the same axis, and a detection source of the detection device (24) passes through the axis. Instead of manually sleeving or pulling out the temperature measuring and sampling probe (200), the replacement system can reduce the labor intensity of operators, reduce the harm of the high-risk environment to health, and improve the working efficiency. Further disclosed is a replacement method of the replacement system for the metallurgical temperature measuring and sampling probe (200).

12 Claims, 8 Drawing Sheets

(56) References Cited

FOREIGN PATENT DOCUMENTS

| | | | | | | |
|---|---|---|---|---|---|---|
| CN | 109570948 | A | | 4/2019 | | |
| CN | 109590994 | A | * | 4/2019 | ................ | B25J 9/00 |
| CN | 110066897 | A | * | 7/2019 | ............... | C21B 7/12 |
| CN | 110231195 | A | | 9/2019 | | |
| CN | 111272478 | A | | 6/2020 | | |
| CN | 210704842 | U | | 6/2020 | | |
| CN | 210774436 | U | | 6/2020 | | |
| CN | 111426528 | A | | 7/2020 | | |
| JP | H07294512 | A | | 11/1995 | | |
| JP | 3021202 | B2 | * | 3/2000 | | |
| KR | 19840007030 | A | | 12/1984 | | |

OTHER PUBLICATIONS

Computer translation of CN_110231195_A (Year: 2026).*
Computer translation of CN_111272478_A (Year: 2026).*
Computer translation of CN_110066897_A (Year: 2026).*
Computer translation of CN_109061209_A (Year: 2026).*
Computer translation of CN_109590994_A (Year: 2026).*
Computer translation of JP_3021202_B1 (Year: 2026).*
Computer translation of JP 3021202 B2 (Year: 2026).*
English Translation of International Search Report in Application No. PCT/CN2022/115842 dated Nov. 28, 2022, 2 pages.
Japanese Patent Office Notice of Reasons for Refusal for JP Application No. 513301/2024 dated Dec. 17, 2024 with English Translation (10 pages).
European Patent Office Communication pursuant to Article 94(3) EPC for EP Application No. 22863453.1 dated Oct. 23, 2025 (9 pages).
European Patent Office Communication for EP Application No. 22863453.1 dated Oct. 17, 2024 (12 pages).

* cited by examiner

REPLACEMENT SYSTEM AND REPLACEMENT METHOD FOR METALLURGICAL TEMPERATURE MEASURING AND SAMPLING PROBE

CROSS-REFERENCE TO RELATED APPLICATIONS

This application is a U.S. national phase entry under 35 USC § 371 of Patent Cooperation Treaty Application No. PCT/CN2022/115842 filed Aug. 30, 2022, which in turn claims priority from Chinese Patent Application No. 202111006165.6, filed Aug. 30, 2021. Each of the above-described applications is hereby incorporated herein by reference in their entirety.

TECHNICAL FIELD

The present invention relates to a metallurgical technology, in particular to a replacement system and replacement method for a metallurgical temperature measuring and sampling probe.

BACKGROUND

In processes such as steelmaking and continuous casting in a steel metallurgy process, it is necessary to extract a metal solution sample body from a metal solution and analyze parameters such as its chemical composition based on the sample. When the metal solution sample body is extracted, in general, a rod-shaped temperature measuring and sampling probe with a temperature measuring and sampling function sleeves a vertically moving temperature measuring and sampling gun (hereinafter referred to as a temperature measuring gun), the temperature measuring gun together with the temperature measuring and sampling probe is inserted into a large ladle (a container) loaded with liquid molten metal by a conveying mechanism, the top of the probe is equipped with a thermocouple for temperature measurement of molten metal, while the molten metal enters a steel die through a sampling port of the probe. When the probe leaves the large ladle, the metal solidifies into a solid sample in the steel die. The sample needs to be sent to an analysis chamber for measurement of parameters such as its chemical composition after being taken out.

Typically, the temperature measuring and sampling probe is mainly composed of two sections of paper long circular tubes, divided into a clamping section and a sampling section. In order to analyze the metal composition in the ladle in real time, the metal sample body formed by solidification must be separated in time from the sampling section of the temperature measuring and sampling probe. Currently, the temperature measuring and sampling probe manually sleeves the temperature measuring gun, the temperature measuring gun carries the temperature measuring and sampling probe to enter a large ladle loaded with molten metal to complete the temperature measuring and sampling operation, and then is lifted, and an operator pulls out the probe from the temperature measuring gun and strikes the paper tube in the sampling section to take out the metal sample body. Due to the probe body which is mostly in a burning state during manual operation, and the heavy smoke and dust generated by steelmaking and the high temperature of the large ladle, damage is caused to the physical health of operators.

An existing replacement method for a temperature measuring and sampling probe, such as Chinese patent application No. CN201922259240.4 discloses "an automatic insertion and pulling-out device for robot temperature measuring and sampling", which includes a sampling device, an automatic gripping device, a sampling rod storage device, and a to-be-tested product storage device. In view of the high operating rate and harsh environmental conditions of temperature measurement and sampling in steelmaking, combined with the characteristics of the operation accuracy and programmability of a robot, an automatic sampling and storage process is achieved. A specific structural form and technical details of a gripping device are not described in this solution.

Chinese patent application No. CN201811613127.5 discloses "an automatic abutting joint device for a temperature measuring probe and a temperature measuring gun". The automatic abutting joint device includes an opening-angle manipulator and a translational manipulator which are respectively fixed to a frame, the frame is disposed on a manipulator, two semi-conical plates are respectively fixed to two clamping fingers of the opening-angle manipulator, when the clamping fingers of the opening-angle manipulator are in a clamping closed state, the two semi-conical plates are in abutting joint together to form a conical cylinder, the axis of the conical cylinder is perpendicular to a positioning plate, and the positioning plate is provided with a position sensor. The position sensor mounted in this patent cannot detect the position of the probe in a clamping jaw nor the axis of the temperature measuring gun, possibly affecting the abutting joint operation.

SUMMARY

An object of the present invention is to provide a replacement system and replacement method for a metallurgical temperature measuring and sampling probe, which can reduce the labor intensity of operators, reduce the harm of the high-risk environment to health of the operators, and improve the working efficiency instead of manually sleeving or pulling out the temperature measuring and sampling probe.

To achieve the above object, the technical solution of the present invention is as follows:

a replacement system for a metallurgical temperature measuring and sampling probe is arranged at a temperature measuring gun for measuring the temperature of a molten metal ladle, and includes: a six-axis manipulator, a clamping tool mounted at a tail end of the six-axis manipulator, a shelf for storing the temperature measuring and sampling probe, a shearing machine configured to cut a sampling segment and a clamping segment of the temperature measuring and sampling probe apart, and a waste material box; wherein, the temperature measuring gun, the shelf, the shearing machine, and the waste material box are sequentially arranged in different directions within a rotation range of the six-axis manipulator, respectively, wherein the waste material box is arranged close to the shearing machine;

the temperature measuring and sampling probe is of a round rod type, and is provided with a sampling segment and a clamping segment, wherein the clamping segment is of a hollow structure and is provided with an opening for allowing the temperature measuring gun to insert; and the temperature measuring gun is of a round rod type, a diameter of a head of the temperature measuring gun is smaller than a diameter of a body of the temperature measuring gun, and a gradual transition section is formed between the head and the body; and the clamping tool includes a base, a clamping jaw configured to clamp the temperature measuring and sampling probe and a positioning jaw which are arranged in parallel at a front end of the base, and a detection device located between the clamping jaw and the positioning jaw, a center line of a positioning space of the positioning jaw and a center line of a clamping space of the clamping jaw are located on the same axis, and a detection source of the detection device passes through the axis.

Further, the replacement system further includes a safety protection fence enclosing the temperature measuring gun, the six-axis manipulator, the shelf, the shearing machine and the waste material box.

Preferably, the clamping jaw includes: a left support arm, a right support arm, and a translational cylinder which can drive the left support arm and the right support arm to move in opposite directions, a left clamping block disposed at an end of the left support arm, and a right clamping block disposed at an end of the right support arm, and a V-shaped or trapezoidal groove is disposed in a center of each of opposite sides of the left clamping block and right clamping block along an axial direction; and the left clamping block and the right clamping block have a length which is 3-4 times an outer diameter of the clamping segment of the temperature measuring and sampling probe.

Preferably, the left support arm and the right support arm have a C-shaped structure.

Preferably, both sides in the V-shaped or trapezoidal groove of the left clamping block are evenly provided with a plurality of trenches at intervals, and both sides in the V-shaped or trapezoidal groove of the right clamping block are evenly provided with a plurality of trenches at intervals, and preferably, each trench has a depth of 5-10 mm, and a spacing between the adjacent trenches is 30-40 mm.

Preferably, the positioning jaw includes an opening-angle cylinder, and a left positioning finger and a right positioning finger which are arranged on two swing arms of the opening-angle cylinder, wherein the left positioning finger and the right positioning finger each include a base portion and a clamping portion located at a front end of the base portion, each clamping portion is V-shaped, and an inner bottom portion of each clamping portion is an arc-shaped concave surface; preferably, inner sides of V-shaped two ends of each clamping portion are each provided with an arc-shaped chamfer; and an inner diameter of a positioning space enclosed by cross closure of the left positioning finger and the right positioning finger is matched with an outer diameter of the body of the temperature measuring gun, and a center line of the positioning space enclosed by the cross closure of the left positioning finger and the right positioning finger and a center line of a clamping space formed by closure of the left clamping block and the right clamping block of the clamping jaw are the same straight line.

Preferably, the detection device is a non-contact ranging sensor, preferably a laser sensor.

A replacement method of the replacement system for the metallurgical temperature measuring and sampling probe according to the present invention includes the steps of:

1) driving the clamping tool to be close to the temperature measuring gun by the six-axis manipulator, scanning and detecting a position of the temperature measuring gun with the detection device on the clamping tool, then moving the clamping tool to the shelf, grabbing the clamping segment of the temperature measuring and sampling probe with the clamping jaw on the clamping tool, and confirming whether a position of the temperature measuring and sampling probe in the clamping jaw of the clamping tool is located at an axis with the detection device;

2) driving the temperature measuring and sampling probe to be close to the head of the temperature measuring gun by the six-axis manipulator, performing cross closure on the left positioning finger and the right positioning finger of the positioning jaw to enclose the head of the temperature measuring gun in a positioning space enclosed by the left positioning finger and the right positioning finger, then grabbing the temperature measuring and sampling probe by the clamping jaw to sleeve the head of the temperature measuring gun, when the head of the temperature measuring gun enters the clamping segment of the temperature measuring and sampling probe for at least 30 mm, allowing the left positioning finger and the right positioning finger of the positioning jaw to release the temperature measuring gun, and then driving the temperature measuring and sampling probe to complete sleeving the temperature measuring gun by the six-axis manipulator; and then allowing the six-axis manipulator to be detached from the temperature measuring gun, and driving the temperature measuring and sampling probe to descend and enter the molten metal ladle by the temperature measuring gun to detect the temperature of molten metal and take a molten metal sample;

3) after completion of temperature measuring and sampling operations, allowing the temperature measuring gun to ascend, driving the clamping tool to be close to an upper portion of the temperature measuring gun by the six-axis manipulator, allowing the left positioning finger and the right positioning finger of the positioning jaw to move in opposite directions to grasp and position the upper portion of the temperature measuring gun, then allowing the left clamping block and the right clamping block of the clamping jaw to move in opposite directions to clamp the clamping segment of the temperature measuring and sampling probe, then allowing the left positioning finger and the right positioning finger of the positioning jaw to release the temperature measuring gun, and pulling out the temperature measuring and sampling probe from the temperature measuring gun by the clamping jaw under the drive of the six-axis manipulator; and 4) driving the clamping tool to feed the sampling segment of the temperature measuring and sampling probe into the shearing machine by the six-axis manipulator, after cutting off the sampling segment of the temperature measuring and sampling probe, driving the clamping tool to bring the clamping segment of the temperature measuring and sampling probe to the waste material box by the six-axis manipulator while allowing the left clamping block and the right clamping block of the clamping jaw to be separated to throw the clamping segment of the temperature measuring and sampling probe into the waste material box, and allowing the six-axis manipulator to return to a standby position.

Preferably, after pulling out the temperature measuring and sampling probe from the temperature measuring gun by the clamping jaw under the drive of the six-axis manipulator in the step 3), the left positioning finger and the right positioning finger of the positioning jaw are closed again, and if the left positioning finger and the right positioning finger of the positioning jaw are completely closed, then it is further confirmed that the temperature measuring and sampling probe has been completely pulled out from the temperature measuring gun.

The replacement method of the present invention is compared with the existing replacement methods for a temperature measuring and sampling probe:

Chinese patent application No. CN201922259240.4 discloses "an automatic insertion and pulling-out device for robot temperature measuring and sampling", a specific structural form and technical details of a gripping device are not described in this solution, the structural design and using method of the positioning jaw and the clamping jaw provided by the present invention are not mentioned, and a probe processing method after sampling operation is not disclosed.

Chinese patent application No. CN201811613127.5 discloses "an automatic abutting joint device for a temperature measuring probe and a temperature measuring gun". Compared with the technical solution disclosed, the positioning jaw arranged up and down during closing has a greater positioning range in the present invention, so the temperature measuring gun can be positioned better without the semi-conical plate structures described in the comparative solution; and in addition, the detection device disposed between the positioning jaw and the clamping jaw in the present invention can not only directly detect the position of the probe in the clamping jaw, but also can measure the axis posture and position of the temperature measuring gun in a process of allowing the clamping tool to be close to different orientations of the temperature measuring gun. A mounting position and a detection method of a position sensor mounted on an upper surface of a frame in this patent are different from those in the present invention, and the position sensor cannot detect the position of the probe in the clamping jaw.

The beneficial effects of the present invention are as follows:

1) in the present invention, the six-axis manipulator is used to cooperate with the clamping tool to realize a plurality of operations such as picking, storing, sleeving, pulling out, and post-processing of the temperature measuring and sampling probe, the operation surface is compact, the efficiency is high, and the operation can be continuously performed for a long time.
2) In the clamping tool according to the present invention, the left positioning finger and the right positioning finger of the positioning jaw have a V-shaped structure with an arc-shaped concave surface at an inner bottom portion thereof, and the left positioning finger and the right positioning finger are in cross arrangement up and down when the positioning jaw is closed, thereby performing a larger positioning range with a smaller structure size.
3) In the present invention, the detection device is disposed between the positioning jaw and the clamping jaw, which can not only directly detect the position of the temperature measuring and sampling probe in the clamping jaw, but also can measure the axis posture and end position of the temperature measuring gun in a process of allowing the clamping tool to be close to different orientations of the temperature measuring gun, effectively expanding the function of the clamping tool, while also improving the clamping stability and reliability.
4) Both sides in the V-shaped or trapezoidal groove in each of the left clamping block and the right clamping block of the clamping jaw of the clamping tool in the present invention are provided with the trenches, so that the clamping stability of clamping the temperature measuring and sampling probe can be effectively improved, particularly after the surface of the clamping segment of the temperature measuring and sampling probe after completion of temperature measuring and sampling is carbonized, edges of the trenches can crush a carbonized layer, and carbon slag can be led out of the trenches, thereby effectively improving the friction force of the surfaces of the clamping blocks.

DETAILED DESCRIPTION

Figure 1:
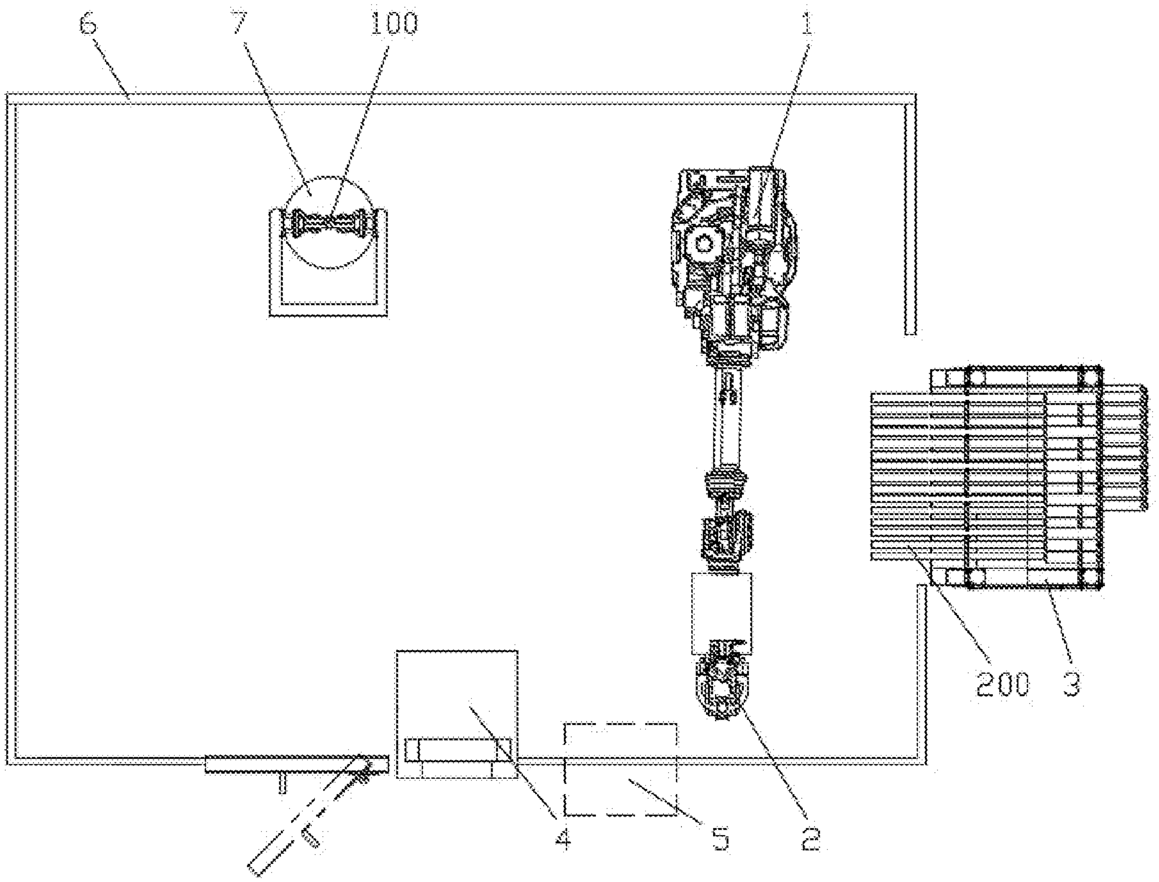
FIG. 1 is a schematic plan layout view of a replacement system according to the present invention.

Referring to FIGS. 1 to 7, a replacement system for a metallurgical temperature measuring and sampling probe provided by the present invention is arranged at a temperature measuring gun 100 for measuring the temperature of a molten metal ladle, and includes a six-axis manipulator 1, a clamping tool 2 mounted at a tail end of the six-axis manipulator 1, a shelf 3 for storing a temperature measuring and sampling probe 200, a shearing machine 4 configured to cut a sampling segment 201 and a clamping segment 202 of the temperature measuring and sampling probe 200 apart, and a waste material box 5 (as shown in a dashed box in FIG. 1).

It should be noted that the molten metal ladle can be understood as a container containing molten metal.

In other embodiments, the replacement system may not be provided with the waste material box 5. The replacement system for the metallurgical temperature measuring and sampling probe of the present invention is used to allow the temperature measuring and sampling probe 200 to cooperate with the temperature measuring gun 100, so that the temperature measuring and sampling probe 200 performs temperature measuring and sampling on the molten metal ladle, and after completion of temperature measuring and sampling, the temperature measuring and sampling probe 200 is separated from the temperature measuring gun 100, so that the shearing machine 4 cuts the sampling segment 201 and the clamping segment 202 of the temperature measuring and sampling probe 200, and the cut sampling segment 201 is used for subsequent analysis. The temperature measuring gun 100, the shelf 3, the shearing machine 4, and the waste material box 5 are sequentially arranged in different directions within a rotation range of the six-axis manipulator 1, respectively, wherein the waste material box 5 is arranged close to the shearing machine 4.

It should be noted that the six-axis manipulator 1, the clamping tool 2, the shelf 3 and the shearing machine 4 are in a plane provided with a temperature measuring and sampling hole 7, and the molten metal ladle is located below the temperature measuring and sampling hole 7 (i.e., in a direction perpendicular to a paper surface), in other words, the molten metal ladle is not in the same plane as the above components. Both sides of the temperature measuring gun 100 are provided with sliding mechanisms (as shown in FIG. 1, the sliding mechanisms may be pulleys) capable of clamping the temperature measuring gun 100 and driving the temperature measuring gun 100 to move up and down in the direction perpendicular to the paper surface.

Figure 8:
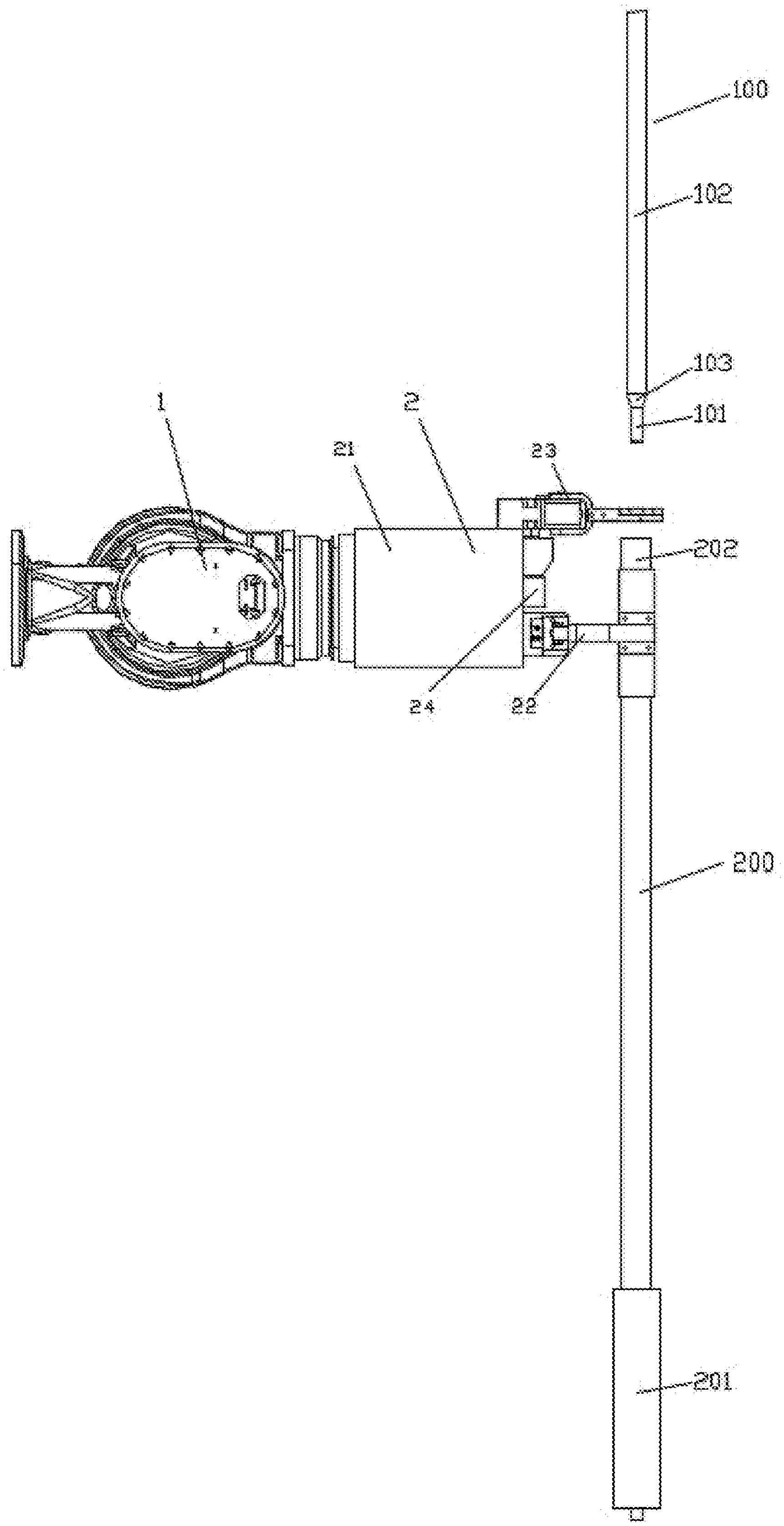
FIG. 8 is a first schematic diagram in which a temperature measuring and sampling probe is clamped by a clamping tool to be ready to sleeve a temperature measuring gun in an embodiment of the present invention.
Figure 9:
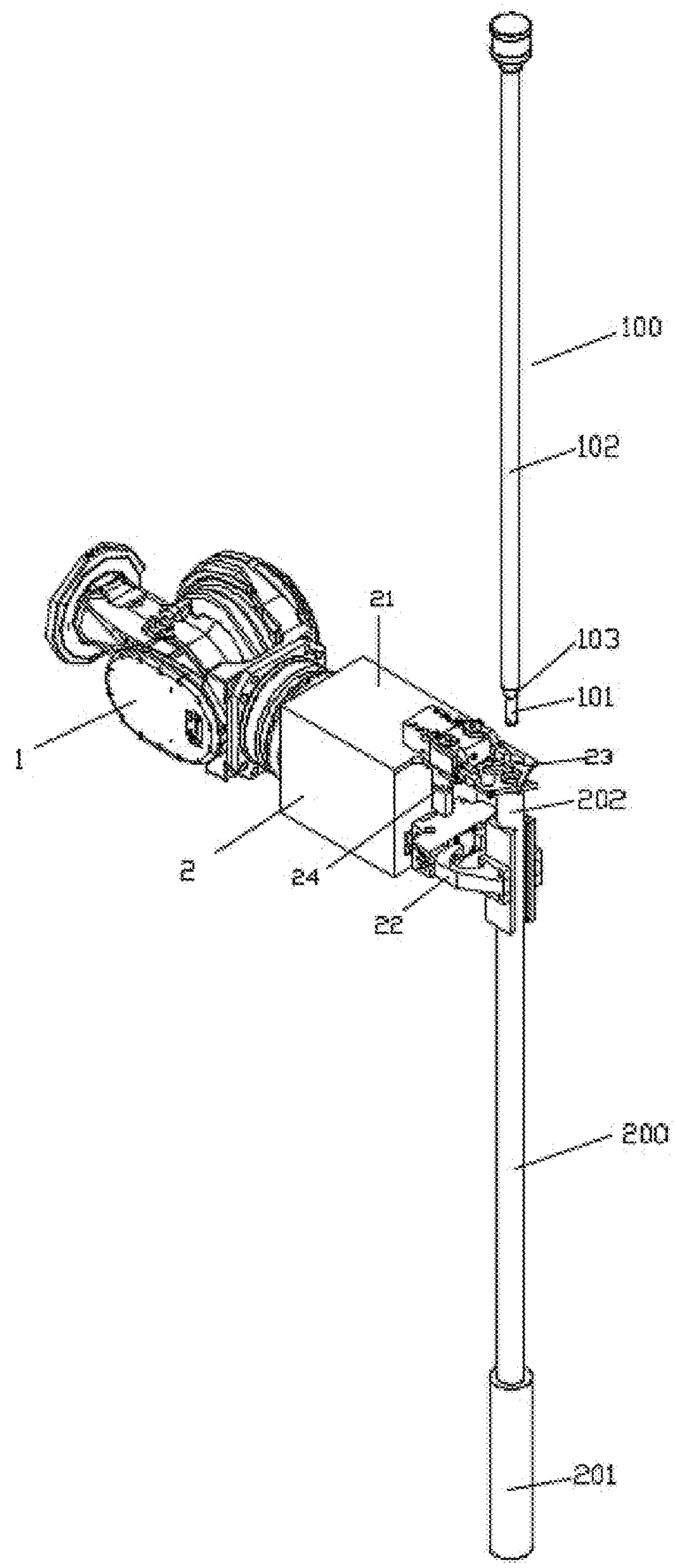
FIG. 9 is a second schematic diagram in which a temperature measuring and sampling probe is clamped by a clamping tool to be ready to sleeve a temperature measuring gun in an embodiment of the present invention.
Figure 10:
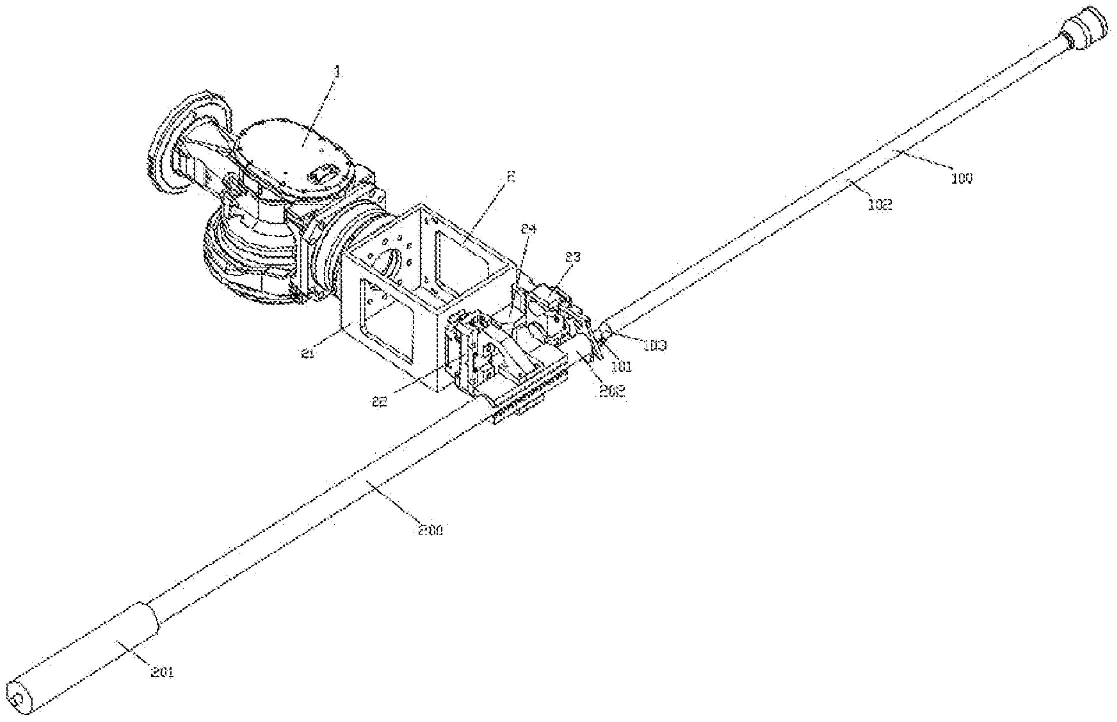
FIG. 10 is a third schematic diagram in which a temperature measuring and sampling probe is clamped by a clamping tool to sleeve a temperature measuring gun in an embodiment of the present invention.

Referring to FIGS. 8 and 9, the temperature measuring and sampling probe 200 is of a round rod type, and is provided with a sampling segment 201 and a clamping segment 202, wherein the clamping segment 202 is of a hollow structure and is provided with an opening for allowing the temperature measuring gun 100 to insert; and the temperature measuring gun 100 is of a round rod type and includes a head 101 and a body 102, a diameter of the head 101 is smaller than a diameter of the body 102, and a gradual transition section 103 is formed between the head 101 and the body 102.

When the temperature measuring gun 100 is inserted into the temperature measuring and sampling probe 200 for a certain depth, the temperature measuring gun 100 is electrically connected to the temperature measuring and sampling probe 200, and at this time, the temperature of molten metal can be measured by a thermocouple located on the sampling segment 201.

The clamping tool 2 includes a base 21, a clamping jaw 22 configured to clamp the temperature measuring and sampling probe 200 and a positioning jaw 23 which are arranged in parallel at a front end of the base 21, and a detection device 24 located between the clamping jaw 22 and the positioning jaw 23, and a detection source of the detection device 24, a center line of a clamping space of the clamping jaw 22, and a center line of a positioning space of the positioning jaw 23 are located on the same axis.

It should be noted that the positioning jaw 23 does not clamp the head 101 of the temperature measuring gun 100, but limits the head 101 of the temperature measuring gun 100 in a positioning space, so that the temperature measuring gun 100 cannot move to a space outside the positioning space.

Further, with reference to FIG. 1, the replacement system for the metallurgical temperature measuring and sampling probe of the present invention further includes a safety protection fence 6 enclosing the temperature measuring gun 100, the six-axis manipulator 1, the shelf 3, the shearing machine 4 and the waste material box 5.

Figure 2:
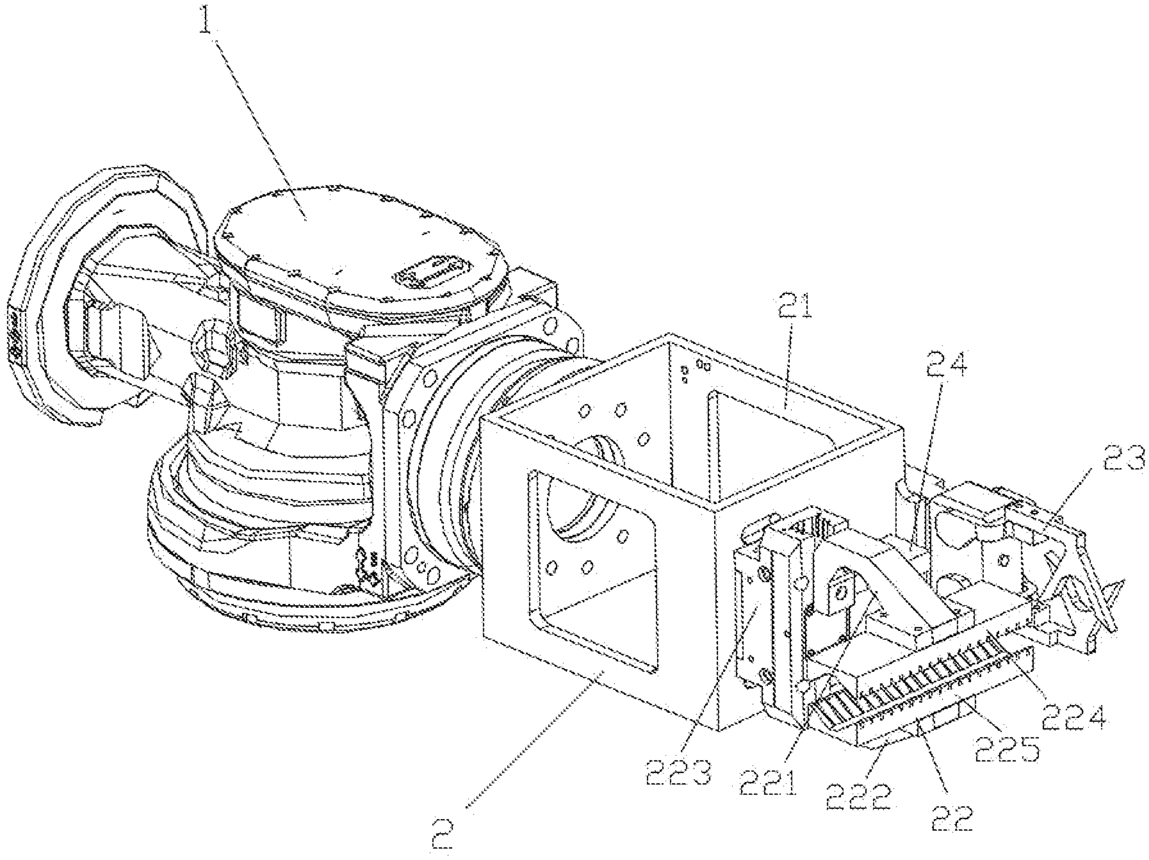
FIG. 2 is a perspective view of a six-axis manipulator and a clamping tool according to an embodiment of the present invention.
Figure 3:
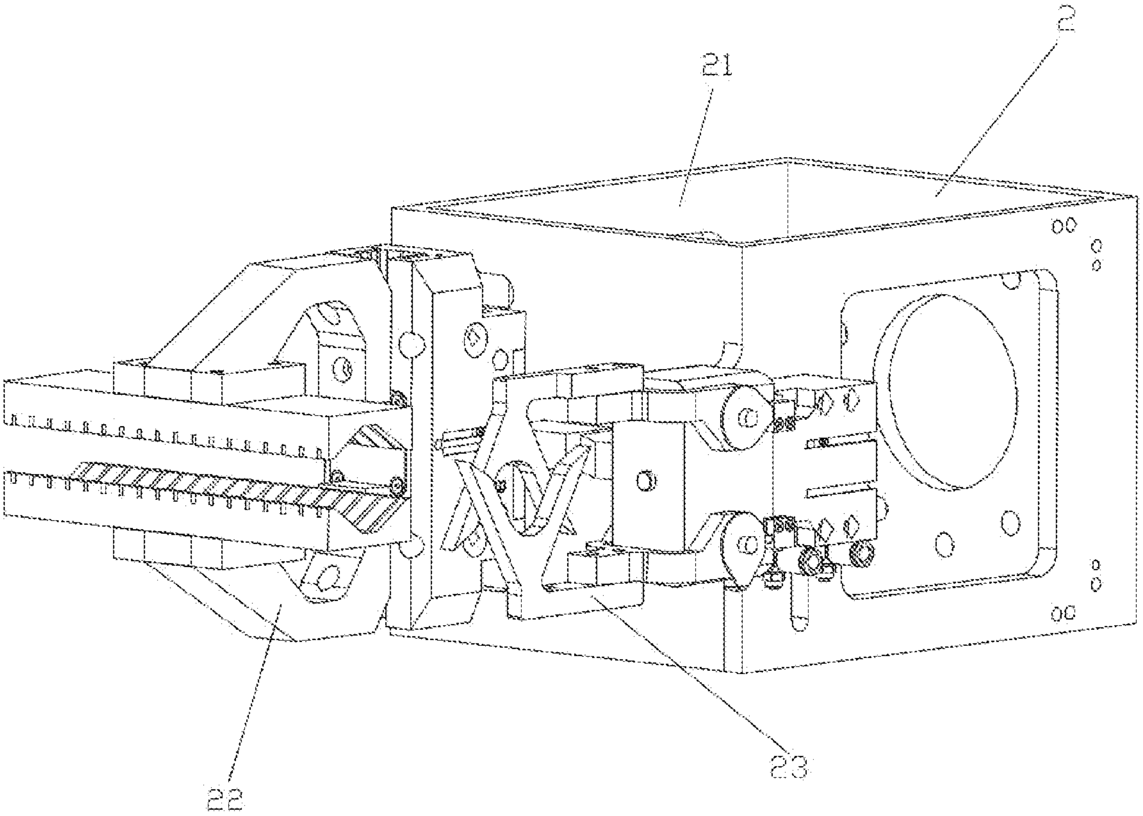
FIG. 3 is a perspective view of a clamping tool according to an embodiment of the present invention.
Figure 7:
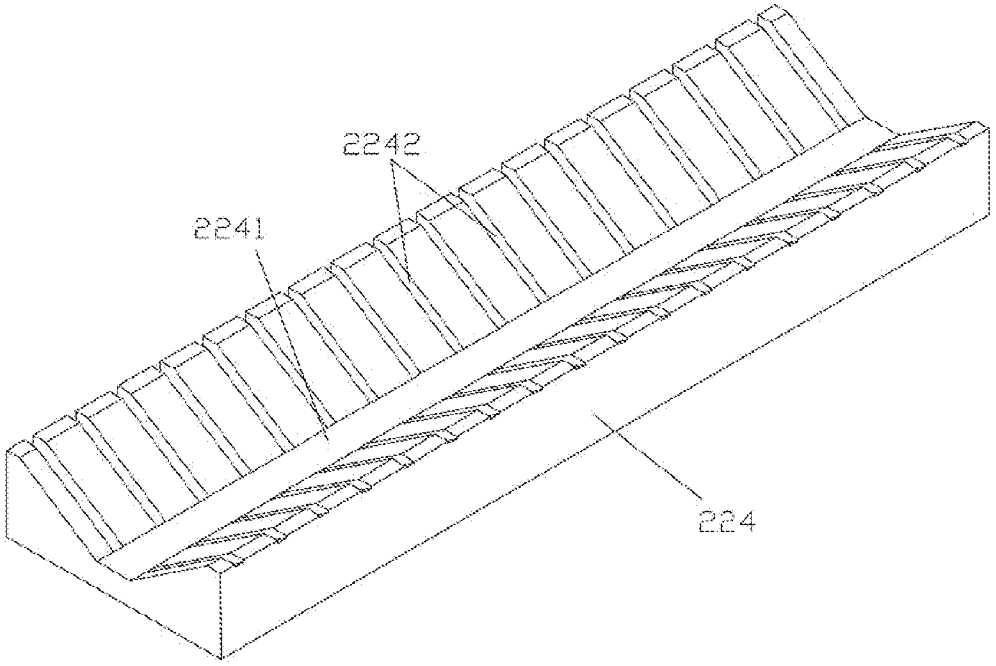
FIG. 7 is a schematic diagram of a left clamping block according to an embodiment of the present invention.

Preferably, with reference to FIG. 2 and in combination with FIG. 7, the clamping jaw 22 includes a left support arm 221, a right support arm 222, a translational cylinder 223 (a radial gripper) which can drive the left support arm 221 and the right support arm 222 to move in opposite directions, a left clamping block 224 disposed at an end of the left support arm 221, and a right clamping block 225 disposed at an end of the right support arm 222. A V-shaped or trapezoidal groove 2241 is disposed in a center of each of opposite sides of the left clamping block 224 and the right clamping block 225 in an axial direction. The left clamping block 224 and the right clamping block 225 have a length which is 3-4 times an outer diameter of the clamping segment 202 of the temperature measuring and sampling probe 200. The left support arm 221 and the right support arm 222 have a C-shaped structure.

Preferably, with reference to FIG. 7, both sides in the V-shaped or trapezoidal groove 2241 of the left clamping block 224 are evenly provided with a plurality of trenches 2242 at intervals, and both sides in the V-shaped or trapezoidal groove 2241 of the right clamping block 225 are evenly provided with a plurality of trenches 2242 at intervals (taking the left clamping block 224 as an example, the same below). Preferably, each trench 2242 has a depth of 5-10 mm, and a spacing between the adjacent trenches 2242 is 30-40 mm.

Preferably, a spacing between the adjacent trenches 2242 is 30 mm.

Preferably, with reference to FIGS. 2, 3 and 8 to 10, the base 21 of the clamping tool 2 is a metal frame, a front end face of which is planar.

Figure 4:
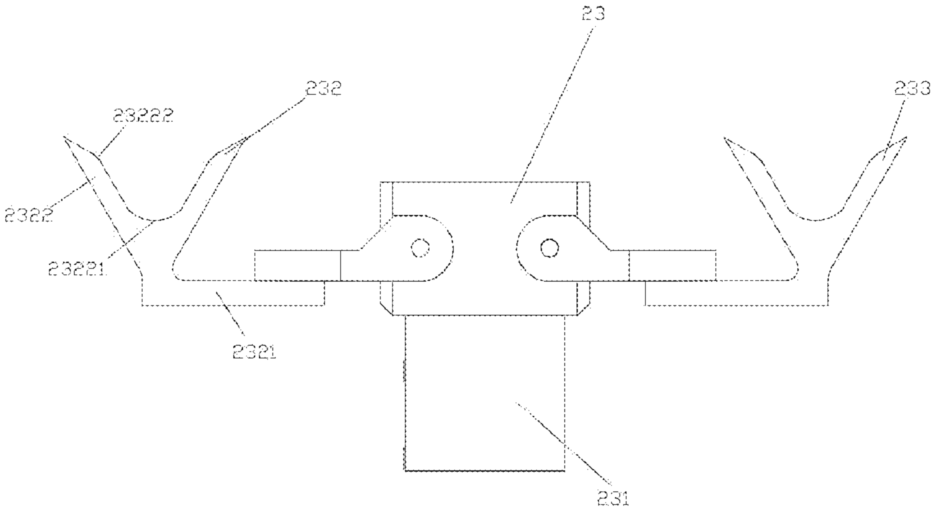
FIG. 4 is a schematic structural diagram of a positioning jaw according to an embodiment of the present invention.
Figure 5:
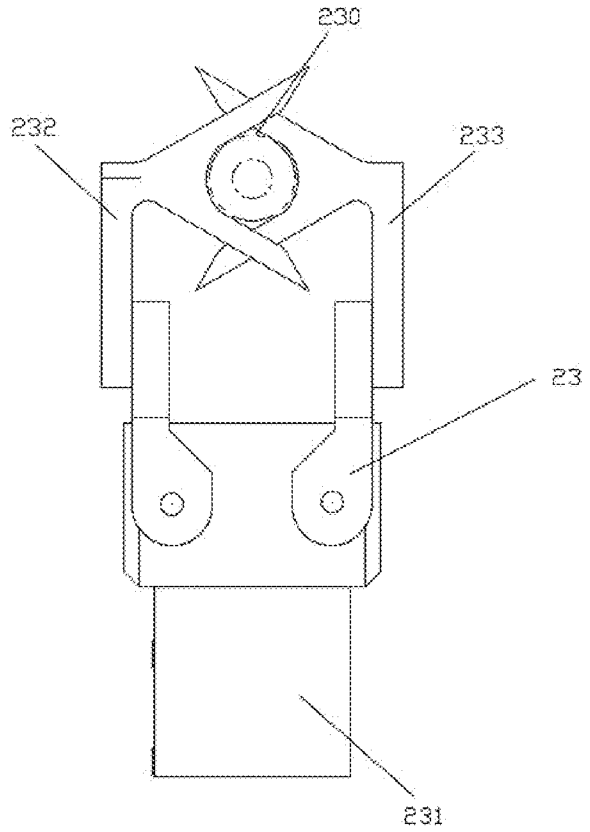
FIG. 5 is a schematic diagram of a use state of the positioning jaw according to the embodiment of the present invention.
Figure 6:
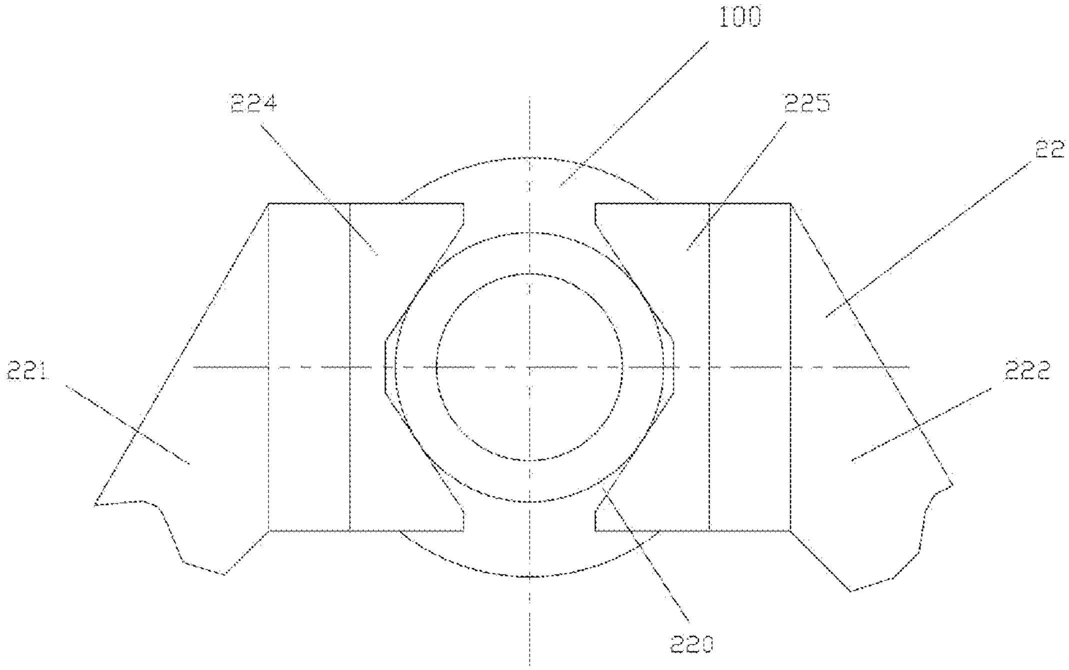
FIG. 6 is a schematic diagram of a use state of a clamping jaw according to an embodiment of the present invention.

Preferably, with reference to FIG. 4 in combination with FIGS. 5 and 6, the positioning jaw 23 includes an opening-angle cylinder 231, and a left positioning finger 232 and a right positioning finger 233 which are arranged on two swing arms of the opening-angle cylinder 231. The left positioning finger 232 and the right positioning finger 233 each include a base portion 2321 (taking the left positioning finger 232 as an example, the same below) and a clamping portion 2322 located at a front end of the base portion 2321. Each clamping portion 2322 is V-shaped, and an inner bottom portion 23221 of each clamping portion 2322 is an arc-shaped concave surface. Preferably, inner sides of V-shaped two ends of each clamping portion 2322 are each provided with an arc-shaped chamfer 23222. A positioning space 230 enclosed by cross closure of the left positioning finger 232 and the right positioning finger 233 is matched with an outer diameter of the body 102 of the temperature measuring gun 100, and a center line of the positioning space 230 enclosed by the cross closure of the left positioning finger 232 and the right positioning finger 233 and a center line of a clamping space 220 formed by closure of the left clamping block 224 and the right clamping block 225 of the clamping jaw 22 are located on the same axis, and the detection source of the detection device 24 passes through the axis.

Preferably, the detection device 24 is a non-contact ranging sensor, preferably a laser sensor.

Referring to FIGS. 1 to 10, a replacement method of the replacement system for the metallurgical temperature measuring and sampling probe according to the present invention includes the steps of:

1) driving the clamping tool 2 to be close to the temperature measuring gun 100 by the six-axis manipulator 1, scanning and detecting a position of the temperature measuring gun 100 with the detection device 24 on the clamping tool 2, then moving the clamping tool 2 to the shelf 3, grabbing the clamping segment 202 of the temperature measuring and sampling probe 200 with the clamping jaw 22 on the clamping tool 2, and confirming whether a position of the temperature measuring and sampling probe 200 in the clamping jaw 22 of the clamping tool 2 is located at an axis with the detection device 24;

2) driving the temperature measuring and sampling probe 200 to be close to the head 101 of the temperature measuring gun 100 by the six-axis manipulator 1, performing cross closure on the left positioning finger 232 and the right positioning finger 233 of the positioning jaw 23 to enclose the head 101 of the temperature measuring gun 100 in a positioning space enclosed by the left positioning finger 232 and the right positioning finger 233, then grabbing the temperature measuring and sampling probe 200 by the clamping jaw 22 to sleeve the head 101 of the temperature measuring gun 100, when the head 101 of the temperature measuring gun 100 enters the clamping segment 202 of the temperature measuring and sampling probe 200 for at least 30 mm, allowing the left positioning finger 232 and the right positioning finger 233 of the positioning jaw 23 to release the temperature measuring gun 100, and then driving the temperature measuring and sampling probe 200 to complete sleeving the temperature measuring gun 100 by the six-axis manipulator; and then allowing the six-axis manipulator 1 to be detached from the temperature measuring gun 100, and driving the temperature measuring and sampling probe 200 to descend and enter the molten metal ladle by the temperature measuring gun 100 to detect the temperature of molten metal and take a molten metal sample;

3) after completion of temperature measuring and sampling operations, allowing the temperature measuring gun 100 to ascend, driving the clamping tool 2 to be close to an upper portion of the temperature measuring gun 100 by the six-axis manipulator 1, allowing the left positioning finger 232 and the right positioning finger 233 of the positioning jaw 23 to move in opposite directions to grasp and position the upper portion of the temperature measuring gun 100, then allowing the left clamping block 224 and the right clamping block 225 of the clamping jaw 22 to move in opposite directions to clamp the clamping segment 202 of the temperature measuring and sampling probe 200, then allowing the left positioning finger 232 and the right positioning finger 233 of the positioning jaw 23 to release the temperature measuring gun 100, and pulling out the temperature measuring and sampling probe 200 from the temperature measuring gun 100 by the clamping jaw 22 under the drive of the six-axis manipulator 1; and 4) driving the clamping tool 2 to feed the sampling segment 201 of the temperature measuring and sampling probe 200 into the shearing machine 4 by the six-axis manipulator 1, after cutting off the sampling segment 201 of the temperature measuring and sampling probe 200, driving the clamping tool 2 to bring the clamping segment 202 of the temperature measuring and sampling probe 200 to the waste material box 5 by the six-axis manipulator 1 while allowing the left clamping block 224 and the right clamping block 225 of the clamping jaw 22 to be separated to throw the clamping segment 202 of the temperature measuring and sampling probe 200 into the waste material box 5, and allowing the six-axis manipulator 1 to return to a standby position.

Referring to FIGS. 1 to 10, a replacement method of the replacement system for the metallurgical temperature measuring and sampling probe according to the present invention includes the steps:

1) the clamping tool 2 is driven to be close to the temperature measuring gun 100 by the six-axis manipulator 1, a position of the temperature measuring gun 100 is scanned and detected with the detection device 24 on the clamping tool 2, then the clamping tool 2 is moved to the shelf 3 for storing the temperature measuring and sampling probe 200, one end of the clamping segment 202 of the temperature measuring and sampling probe 200 is grabbed or clamped with the clamping jaw 22 on the clamping tool 2, and it is confirmed whether a position of the temperature measuring and sampling probe 200 in the clamping jaw 22 of the clamping tool 2 is located at an axis with the detection device 24;

2) the temperature measuring and sampling probe 200 is driven to be close to the head 101 of the temperature measuring gun 100 by the six-axis manipulator 1, and cross closure is performed on the left positioning finger 232 and the right positioning finger 233 of the positioning jaw 23 to enclose the head 101 of the temperature measuring gun 100 in a positioning space enclosed by the left positioning finger 232 and the right positioning finger 233, so that the head 101 of the temperature measuring gun 100 is limited in the positioning space for subsequently being sleeved with the temperature measuring and sampling probe 200. Thereafter, the six-axis manipulator 1 drives the temperature measuring and sampling probe 200 to sleeve the head 101 of the temperature measuring gun 100. As shown in FIG. 8, the temperature measuring gun 100 remains stationary and the temperature measuring and sampling probe 200 moves in a direction close to the head 101 of the temperature measuring gun 100 under the drive of the six-axis manipulator 1. When the head 101 of the temperature measuring gun 100 enters the clamping segment 202 of the temperature measuring and sampling probe 200 for at least 30 mm, the left positioning finger 232 and the right positioning finger 233 of the positioning jaw 23 release the temperature measuring gun 100, and thereafter, the six-axis manipulator 1 drives the temperature measuring and sampling probe 200 to continue to perform sleeving until the temperature measuring and sampling probe 200 is electrically connected to the temperature measuring gun 100 to complete the sleeving operation on the temperature measuring gun 100. In other words, the six-axis manipulator 1 drives the temperature measuring and sampling probe 200 to continue to move upwards until sleeving the temperature measuring gun 100 with the temperature measuring and sampling probe 200 is completed. Then, the six-axis manipulator 1 is detached from the temperature measuring gun 100 (e.g., after the six-axis manipulator 1 is detached from the temperature measuring gun 100, the six-axis manipulator 1 can move to a standby position to prevent interference with the temperature measuring gun), and the temperature measuring gun 100 (e.g., under the drive of the sliding mechanisms) drives the temperature measuring and sampling probe 200 to descend and enter the molten metal ladle to detect the temperature of molten metal and take a molten metal sample;

3) after completion of temperature measuring and sampling operations, the temperature measuring gun 100 is allowed to ascend, the six-axis manipulator 1 drives the clamping tool 2 to be close to an upper portion of the temperature measuring gun 100 (i.e., the end, away from the head 101, of the temperature measuring gun 100), and the left positioning finger 232 and the right positioning finger 233 of the positioning jaw 23 is allowed to move in opposite directions to grasp and position the upper portion of the temperature measuring gun 100. Then the left clamping block 224 and the right clamping block 225 of the clamping jaw 22 is allowed to move in opposite directions to clamp the clamping segment 202 of the temperature measuring and sampling probe 200, then the left positioning finger 232 and the right positioning finger 233 of the positioning jaw 23 release the temperature measuring gun 100, and the temperature measuring and sampling probe 200 is pulled out from the temperature measuring gun 100 by the clamping jaw 22 under the drive of the six-axis manipulator 1 (i.e., the temperature measuring and sampling probe 200 moves away from the temperature measuring gun 100 under the drive of the six-axis manipulator 1 until the temperature measuring and sampling probe 200 is completely separated from the temperature measuring gun 100); and 4) the six-axis manipulator 1 drives the clamping tool 2 to feed the sampling segment 201 of the temperature measuring and sampling probe 200 into the shearing machine 4, after cutting off the sampling segment 201 of the temperature measuring and sampling probe 200, the six-axis manipulator 1 drives the clamping tool 2 to bring the clamping segment 202 of the temperature measuring and sampling probe 200 to the waste material box 5 while allowing the left clamping block 224 and the right clamping block 225 of the clamping jaw 22 to be separated to throw the clamping segment 202 of the temperature measuring and sampling probe 200 into the waste material box 5, and the six-axis manipulator 1 is allowed to return to a standby position.

Preferably, after pulling out the temperature measuring and sampling probe 200 from the temperature measuring gun 100 by the clamping jaw 22 under the drive of the six-axis manipulator 1 in the step 3), the left positioning finger 232 and the right positioning finger 233 of the positioning jaw 23 are closed again, and if the left positioning finger 232 and the right positioning finger 233 of the positioning jaw are completely closed, then it is further confirmed that the temperature measuring and sampling probe 200 has been completely pulled out from the temperature measuring gun 100.

Those of ordinary skill in the art should realize that the above embodiments are merely used for illustrating the present invention and not intended to limit the present invention. Variations and modifications made to the above embodiments are intended to fall within the scope of the claims of the present invention as long as they fall within the spirit of the present invention.

What is claimed is:

1. A replacement system for a metallurgical temperature measuring and sampling probe, being arranged at a temperature measuring gun for measuring the temperature of a molten metal ladle, and characterized by comprising: a six-axis manipulator, a clamping tool mounted at a tail end of the six-axis manipulator, a shelf for storing the temperature measuring and sampling probe, a shearing machine and a waste material box; wherein, the temperature measuring gun, the shelf, the shearing machine, and the waste material box are sequentially arranged in different directions within a rotation range of the six-axis manipulator, respectively, wherein the waste material box is arranged close to the shearing machine;

the temperature measuring and sampling probe is of a round rod type, and is provided with a sampling segment and a clamping segment, and the shearing machine is configured to cut the sampling segment and the clamping segment of the temperature measuring and sampling probe apart, wherein the clamping segment is of a hollow structure and is provided with an opening for allowing the temperature measuring gun to insert; and the temperature measuring gun is of a round rod type, a diameter of a head of the temperature measuring gun is smaller than a diameter of a body of the temperature measuring gun, and a gradual transition section is formed between the head and the body; and the clamping tool comprises a base, a clamping jaw configured to clamp the temperature measuring and sampling probe and a positioning jaw which are arranged in parallel at a front end of the base, and a detection device located between the clamping jaw and the positioning jaw, a center line of a clamping space of the clamping jaw and a center line of a positioning space of the positioning jaw are located on the same axis, and a detection source of the detection device passes through the axis.

2. The replacement system for the metallurgical temperature measuring and sampling probe according to claim 1, characterized by further comprising a safety protection fence enclosing the temperature measuring gun, the six-axis manipulator, the shelf, the shearing machine and the waste material box.

3. The replacement system for the metallurgical temperature measuring and sampling probe according to claim 1, characterized in that the clamping jaw comprises: a left support arm, a right support arm, and a translational cylinder which can drive the left support arm and the right support arm to move in opposite directions, a left clamping block disposed at an end of the left support arm, and a right clamping block disposed at an end of the right support arm, and a V-shaped or trapezoidal groove is disposed in a center of each of opposite sides of the left clamping block and right clamping block along a length direction; and the left clamping block and the right clamping block have a length which is 3-4 times an outer diameter of the clamping segment of the temperature measuring and sampling probe.

4. The replacement system for the metallurgical temperature measuring and sampling probe according to claim 3, characterized in that both sides in the V-shaped or trapezoidal groove of the left clamping block are evenly provided with a plurality of trenches at intervals, and both sides in the V-shaped or trapezoidal groove of the right clamping block are evenly provided with a plurality of trenches at intervals.

5. The replacement system for the metallurgical temperature measuring and sampling probe according to claim 3, characterized in that the left support arm and the right support arm have a C-shaped structure.

6. The replacement system for the metallurgical temperature measuring and sampling probe according to claim 1, characterized in that the positioning jaw comprises: an opening-angle cylinder, and a left positioning finger and a right positioning finger which are arranged on two swing arms of the opening-angle cylinder, wherein the left positioning finger and the right positioning finger each comprise a base portion and a clamping portion located at a front end of the base portion, each clamping portion is V-shaped, and an inner bottom portion of each clamping portion is an arc-shaped concave surface; and a range of a positioning space enclosed by cross closure of the left positioning finger and the right positioning finger is matched with an outer diameter of the body of the temperature measuring gun, and a center line of the positioning space enclosed by the cross closure of the left positioning finger and the right positioning finger and a center line of a clamping space formed by closure of the left clamping block and the right clamping block of the clamping jaw are located on the same axis.

7. The replacement system for the metallurgical temperature measuring and sampling probe according to claim 1, characterized in that the detection device is a non-contact ranging sensor.

8. The replacement system for the metallurgical temperature measuring and sampling probe according to claim 4, characterized in that each trench has a depth of 5-10 mm, and a spacing between the adjacent trenches is 30-40 mm.

9. The replacement system for the metallurgical temperature measuring and sampling probe according to claim 6, characterized in that inner sides of V-shaped two ends of each clamping portion are each provided with an arc-shaped chamfer.

10. The replacement system for the metallurgical temperature measuring and sampling probe according to claim 7, characterized in that the non-contact ranging sensor is a laser sensor.

11. A replacement method of the replacement system for the metallurgical temperature measuring and sampling probe according to claim 1, comprising the steps of:

1) Driving the clamping tool to be close to the temperature measuring gun by the six-axis manipulator, scanning and detecting a position of the temperature measuring gun with the detection device on the clamping tool, then moving the clamping tool to the shelf, grabbing the clamping segment of the temperature measuring and sampling probe with the clamping jaw on the clamping tool, and confirming whether a position of the temperature measuring and sampling probe in the clamping jaw of the clamping tool is located at an axis with the detection device;

2) Driving the temperature measuring and sampling probe to be close to the head of the temperature measuring gun by the six-axis manipulator, performing cross closure on the left positioning finger and the right positioning finger of the positioning jaw to enclose the head of the temperature measuring gun in a positioning space enclosed by the left positioning finger and the right positioning finger, then grabbing the temperature measuring and sampling probe by the clamping jaw to sleeve the head of the temperature measuring gun, when the head of the temperature measuring gun enters the clamping segment of the temperature measuring and sampling probe for at least 30 mm, allowing the left positioning finger and the right positioning finger of the positioning jaw to release the temperature measuring gun, and then driving the temperature measuring and sampling probe to complete sleeving the temperature measuring gun by the six-axis manipulator; and then allowing the six-axis manipulator to be detached from the temperature measuring gun, and driving the temperature measuring and sampling probe to descend and enter the molten metal ladle by the temperature measuring gun to detect the temperature of molten metal and take a molten metal sample;

3) After completion of temperature measuring and sampling operations, allowing the temperature measuring gun to ascend, driving the clamping tool to be close to an upper portion of the temperature measuring gun by the six-axis manipulator, allowing the left positioning finger and the right positioning finger of the positioning jaw to move in opposite directions to grasp and position the upper portion of the temperature measuring gun, then allowing the left clamping block and the right clamping block of the clamping jaw to move in opposite directions to clamp the clamping segment of the temperature measuring and sampling probe, then allowing the left positioning finger and the right positioning finger of the positioning jaw to release the temperature measuring gun, and pulling out the temperature measuring and sampling probe from the temperature measuring gun by the clamping jaw under the drive of the six-axis manipulator; and 4) Driving the clamping tool to feed the sampling segment of the temperature measuring and sampling probe into the shearing machine by the six-axis manipulator, after cutting off the sampling segment of the temperature measuring and sampling probe, driving the clamping tool to bring the clamping segment of the temperature measuring and sampling probe to the waste material box by the six-axis manipulator while allowing the left clamping block and the right clamping block of the clamping jaw to be separated to throw the clamping segment of the temperature measuring and sampling probe into the waste material box, and allowing the six-axis manipulator to return to a standby position.

12. The replacement method of the replacement system for the metallurgical temperature measuring and sampling probe according to claim 11, characterized in that after pulling out the temperature measuring and sampling probe from the temperature measuring gun by the clamping jaw under the drive of the six-axis manipulator in the step 3), the left positioning finger and the right positioning finger of the positioning jaw are closed again, and if the left positioning finger and the right positioning finger of the positioning jaw are completely closed, then it is further confirmed that the temperature measuring and sampling probe has been completely pulled out from the temperature measuring gun.

* * * * *